C. O. Crosby. Sheet 1. 2 Sheets.
Paper Folding Mach.
No. 3,687. Reissued Oct. 26, 1869.
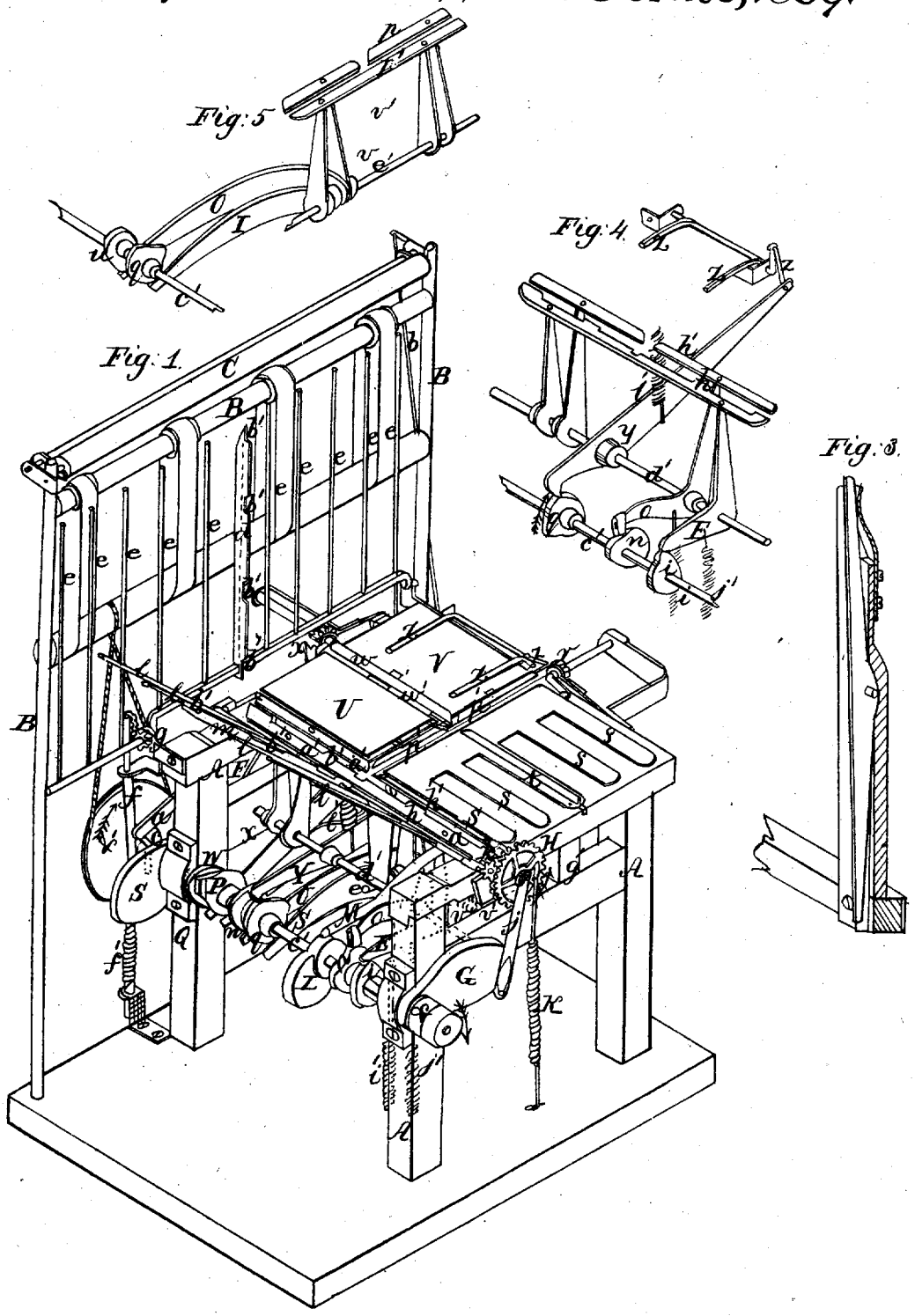
N. PETERS, PHOTO-LITHOGRAPHER, WASHINGTON, D. C.

C. O. Crosby. Sheet 2. 2 Sheets.

Paper Folding Mach.

No. 3,687. Reissued Oct. 26, 1869.

N. PETERS, PHOTO-LITHOGRAPHER, WASHINGTON, D. C.

UNITED STATES PATENT OFFICE.

CHARLES A. DURGIN, OF NEW YORK, N. Y., ASSIGNEE OF C. O. CROSBY.

IMPROVEMENT IN MACHINERY FOR FOLDING PAPER.

Specification forming part of Letters Patent No. 16,266, dated December 23, 1856; Reissue No. 3,687, dated October 26, 1869.

*To all whom it may concern:*

Be it known that CHAUNCEY O. CROSBY, of the city and county of New Haven, and State of Connecticut, invented a new and useful Improvement in Machinery for Folding Paper; and I do hereby declare that the following is a full, clear, and exact description of the construction, character, and operation of the same, reference being had to the accompanying drawings, which make a part of this specification, in which—

Figure 7:
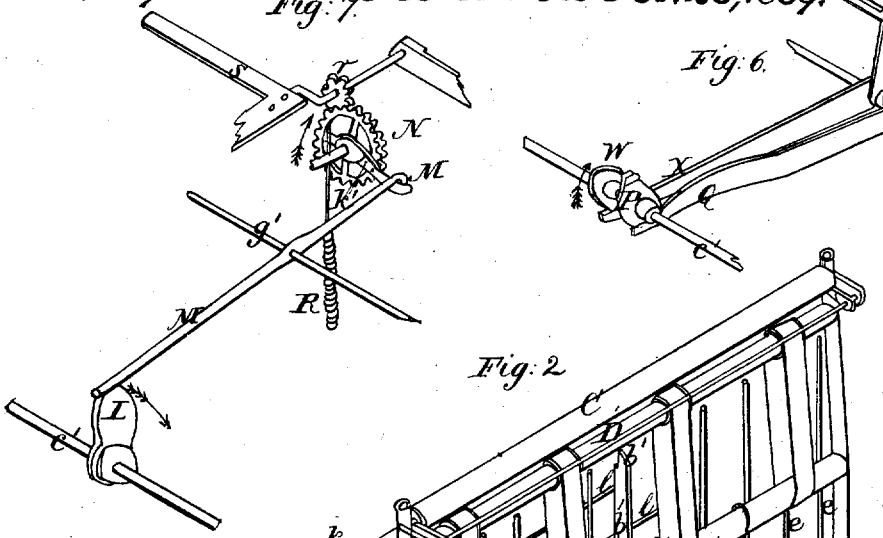
Figure 6:
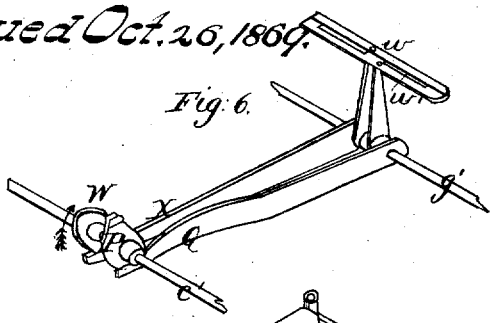
Figure 2:
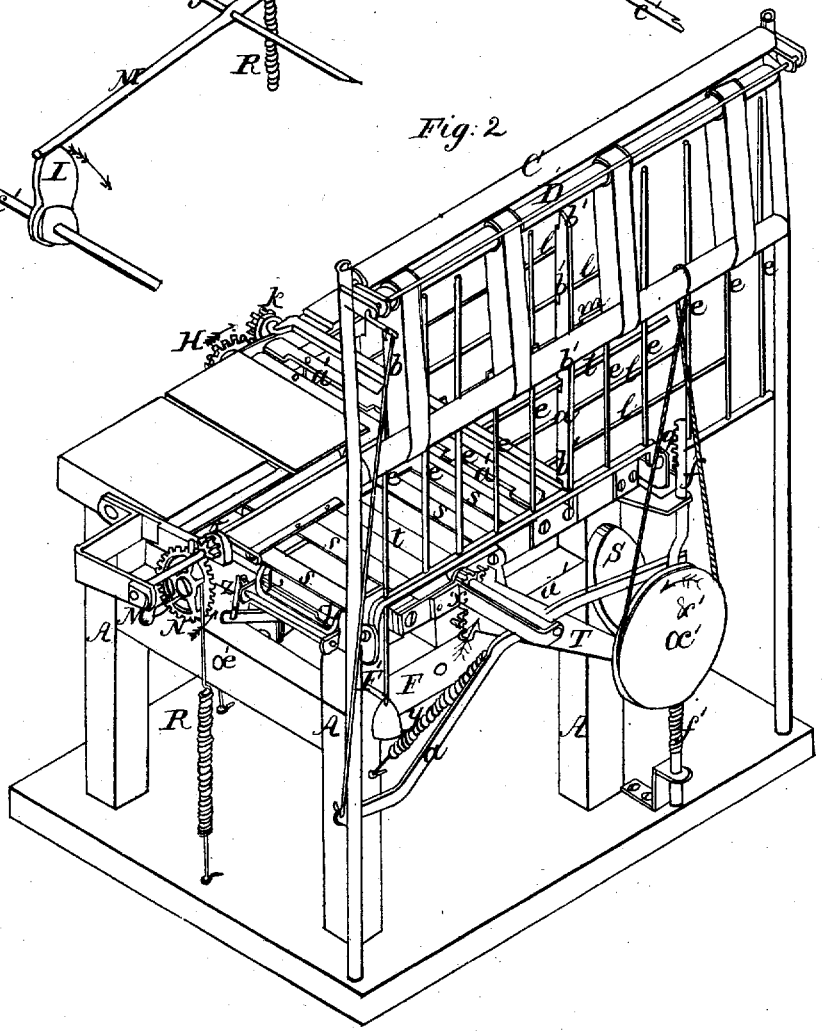

Figure 1 is a perspective view of the machine, taken from the front left-hand corner, showing all the cams, levers, fingers, &c. Fig. 2 is a perspective view of the same, taken from the opposite corner, showing all the gearing, &c., which is not shown in Fig. 1. Fig. 3 is a perspective view of one of the blades fitted to have a parallel motion in forcing the bight of the paper between the gripping-bars, so that the action may be equal. Fig. 4 is a perspective view of a part of the cam-shaft, the first pair of grippers, &c. Fig. 5 is a perspective view of a part of the cam-shaft, second pair of grippers, &c. Fig. 6 is a perspective view of a part of the cam-shaft, third pair of grippers, &c. Fig. 7 is a perspective view of a part of the cam-shaft, lever, &c., for working the fingers *s s*, &c., Figs. 1 and 2.

The improvement consists in so constructing the machine that by proper mechanism the paper will be placed appropriately on the platform by suitable fingers, rods, or plates, which constitute the fly of a printing-press, while a blade attached to and moving therewith will force the bight of the paper between two movable gripping-bars, which will grip and hold it firmly until the rods or fingers of the fly which placed it there have been removed and another set, acting at right angles, shall come over and fold it in the other direction, (at which time the first gripping-bars will relieve it), when another blade will force the bight of the (now double) paper between two other movable gripping-bars, which will hold it as before until another set of fingers, acting at right angles to the last, shall fold it again, when the second gripping-bars will release it as before, and so on to any number of folds desired, and so that one of the gripping-bars in each case will slide back to flatten the bend which had previously been caused near the bight by folding it over when the bight was held between the gripping-bars; and in cutting away a portion of the face of one of each pair of the gripping-bars, and also of the edge of each blade, to allow a portion of the gripping-bars to firmly hold the bight of the paper without binding the blade, which will be necessary when the paper is dry, as the bight would otherwise spring out of the gripping-bars when the blade was withdrawn, and so that it will be susceptible of being directly attached to the printing-press and receiving the papers directly from it, or of being fed by hand, and of folding paper, whether dry or damp, with equal facility.

The frame is made of posts and bars, as seen at A A, &c., or in any other suitable manner. All the cams are placed on the shaft *c′*, as fully shown in Fig. 1, and shown in part in Figs. 2, 4, 5, 6, and 7, and they are made substantially in the shape thus shown, though each may be varied to suit any difference of proportion in the arms of the lever it acts upon, as will be readily suggested to the mind of any mechanic acquainted with the operation of cams and levers; and this shaft *c′* is revolved in the direction indicated by the arrows on the pulleys & *&′*, by any suitable power.

Each of the several levers is made substantially in the form shown generally in Fig. 1, but more particularly in Figs. 4, 5, 6, and 7, though each may be made of a different shape or of different proportions to suit the shape of the cam or position of the fulcrum at the builder's discretion; and each lever is supported by a suitable fulcrum, as shown at *d′*, Figs. 1, 2, and 4, *e′*, Figs. 1, 2, and 5, and *g′*, Figs. 1, 2, 6, and 7, or made of any other suitable form, and placed in any other suitable position which the builder's mind may suggest in each case, so that they may effect the mechanical result intended in any of the well-known ways.

Spiral springs (shown at K, *v*, *f*, R, *y*, &c.) are used to restore the levers, &c., to the position from which they had been forced by the revolving of the cams, though flat springs, face-cams, or any other well-known mechanical device may be used to effect the same purpose.

Pinions are used on the turning parts or bars of the sets of fingers, which are revolved by means of wheels, as shown at H K and N *r*, or rack, as shown at *f*, *g*, and *x*, which are so connected with levers, arms, or projections, as shown at *j* and *f*, Fig. 1, at *x*, M, and *i*, Fig. 2, and M, Fig. 7, that the action of the cam on the lever will turn the wheel or move the rack in the direction indicated by the arrow, which will revolve the pinion and bring over the fingers to fold the paper while the paper is held by the grippers. These wheels and racks may be used interchangeably, or the same may be used in all places, should it be found more convenient by the builder.

To the back part of the frame A A, &c., are attached two posts, B B, in which are used three (or any other suitable number of) rollers for the purpose of feeding the sheet of paper to the folder. The top roller, C, is raised by the lever *a*, worked by the cam *c*, and connected by the connecting-rod *b*, to allow the sheet to be inserted between it and the next below it, D, so that by revolving the rollers the sheet may be passed down over the fingers *e e*, &c., and blade *d*, ready to be laid on the form.

The several parts of the machine being constructed and put together as represented in Figs. 1 and 2, and a sheet fed between the roller C and D, as described in the preceding paragraph, the cam-shaft *c'* is revolved, (in the direction indicated by the arrows on the pulleys,) when the cam *c*, Fig. 1, coming in contact with the projection on the rack-bar *f*, (seen near *e*,) will raise the rack-bar *f*, so as to turn the pinion *g* and bring the rods or fingers *e e*, &c., and blade *d* down in front to lay the sheet upon the platform, when the blades *d* will force the bight of the paper between the gripping-bars *h* and *h'*. At this time the cam *i*, Figs. 1 and 4, will raise the front end of the elbow-shaped lever E, Figs. 1 and 4, which will carry back the upright end or arm of the lever E and force the gripping-bar *h* against the gripping-bar *h'*, so as to hold the bight firmly, while the fingers *e e*, &c., and blade *d*, will, by the ordinary operation of the spiral spring *f'*, be returned to their original position, as shown in Figs. 1 and 2. At this time the cam G, Fig. 1, acting on the lever *j*, will turn the wheel H, Figs. 1 and 2, in the direction indicated by the arrows, which motion will revolve the pinion *k* and bring over the set of fingers *l l*, &c., and blade *m* to fold the paper at right angles to the gripping-bars, *h h'*, and at the same moment the cam *i* will release the lever E, so as to allow a spiral spring indicated by dots at *j'*, Fig. 1, and shown in section at *j'*, Fig. 4, to force down the outer end of the lever E and draw back the gripping-bar *h* and release the bight of the first fold, and to take out the bend made by folding the paper over the gripping-bar *h'*, the spiral spring indicated at *i*, Fig. 1, by dots, and shown in section at *i*, Fig. 4, will force down the outer end or arm of the lever *o* into the lowest or least prominent part of the cam *n*, as shown in Figs. 1 and 4, and thereby move the gripping-bar *h'* outward, which will soon be returned to its original position by the more prominent part of the cam *n*; or the outer end of the lever *o* may be placed below the cam *n* and the position of the spring *i'* changed, when the prominent part of the cam *n* will move the gripping-bar *h'* to take out the bend, and the spring *i'* will return it as may be found most convenient in any case. Suffice it to say, that in working the gripping-bars in each case the cams are designed to act as guides to regulate the motion of the levers, and the springs to hold the levers firmly or constantly against the peripheries of the cams without reference to the relative position of the cam and the part of the lever which comes in contact with it—that is, whether that part of the lever is above or below the cam. It is therefore left to the discretion of each builder of the machine, as he will readily understand the most convenient location and arrangement of the well-known mechanical devices to effect the desired result. When the paper is folded and the bight released and straightened, as before described, the blade *m* will force the bight of the already double paper between the gripping-bars *p* and *p'*, Figs. 1 and 5, when the cam *g* will depress the outer end of the elbow-shaped lever I, and force up the gripping-bar *p'* to grip and firmly hold the bight of the paper, as before described, when the fingers *l l*, &c., will be returned to their original position by the ordinary action of the spiral spring K on the wheel H and pinion *k*.

The cam L (shown in Fig. 1, where its most prominent part is approaching the outer or left-hand end of the lever M, and in Fig. 7, where it is receding from or releasing it) will elevate the left-hand end of the lever M, and consequently depress the right-hand end, which right-hand end, acting on the arm or lever *k'*, will turn the wheel N, Figs. 2 and 7, in the direction indicated by the arrows, and thereby revolve the pinion *r*, Figs. 1, 2, and 7, and carry over the fingers *s s*, &c., and blade *t* to the position shown in Fig. 2 to fold the already double paper a second time. At this time the cam *q* will release the lever I and a spiral spring, *v*, Figs. 1 and 5, attached to the upright part or arm of the lever I, will throw back the gripping-bar *p'* to release the bight of the paper, and the cam *n* coming into a position to allow the outer end of the elbow-shaped lever O to be elevated, a spiral spring, *v'*, Figs. 1 and 5, will move the gripping-bar *p* to smooth out the bend, as in the former case, and the cam *n* will return the gripping-bar *p* to its original position, or vice versa. The blade *t* will then force the already four-fold paper between the gripping-bars *w* and *w'*, and the cams P and W, Figs. 1 and 6, with the levers Q and X, with spiral springs attached in the manner shown at *l'*, Figs. 1 and 4, operating on the lever *y*, or in the manner shown at *v* and *v'* in Figs. 1 and 5, operating on the levers I and O, will operate the gripping-bars *w* and *w'*, as described in the two former cases, and the spring R will throw back the fingers *s s*, &c., to the position shown in Fig. 1, as before. The cam S, Figs. 1 and 2, will then depress the lower end of the lever T, which works on the fulcrum *d'*, Fig. 2, which, by means of the rack and pinion shown at X, Figs. 1 and 2, will throw over the plate U to fold the paper again by pressing it onto the platform *v*, when the gripping-bars *w w'* will release it and smooth out the bend, as in the former cases, and the spring *y*, Fig. 2, will throw back the plate U to its former position, as shown in Fig. 1. The cam *q* will then elevate the left-hand end of the lever *y*, Figs. 1 and 4, which works on the fulcrum *d'*, which by means of the connecting-rod *z*, Figs. 1, 2, and 4, will raise the bent bars Z Z to a perpendicular position, and thus throw off the folded paper onto any proper receptacle, and the spring *l'*, Figs. 1 and 4, will then elevate the right-hand end of the lever *y*, and return the bent bars Z Z to the position shown in Fig. 1, when another sheet may be received, and so on.

One of each pair of gripping-bars must have a portion of its face removed, as shown at *a'*, &c., Figs. 1 and 2; and each of the blades must have a portion of its edge removed, as shown at *b'*, &c., Figs. 1 and 2, to allow the gripping-bars to grip the bight of the paper firmly without binding the blade, for if not gripped firmly when the paper is dry its elasticity would cause the bight to spring out of the gripping-bars as soon as the pressure of the blade was removed, and therefore could not be depended on, though in damp paper it might work well without it.

All the blades may, if desired, have a movable blade attached by a fulcrum-pin in the center, as seen in Fig. 3, so that the blades may always act parallel with the gripping-bars, in which case the movable blade only will act on the paper.

These machines may be constructed so as to make any number of folds desired, as from folio to the highest number ever used.

What is claimed as the invention of CHAUNCEY O. CROSBY is—

1. The combination, with a vibrating fly, of a folding-blade which shall form a bight or double in the sheet for the first fold as it is received from the press and deliver the same to mechanism to complete the folds, whereby the sheets of paper may be folded direct from a printing-press, substantially as described and specified.

2. The combination, with a vibrating fly and folding-blade, of gripping-bar, constructed, arranged, and operating substantially as described and specified.

3. The folding-blades, in combination with the fingers, arranged and operating substantially as described and specified.

4. The employment and use of jaws, one of which in each set is cut away, in combination with a folding-blade having portions cut away, so that the sheets of paper can be gripped at the points where the blade is cut away and firmly held during the retraction of the folding-blade from the jaws, substantially as described and specified.

CHAS. A. DURGIN.

Witnesses:
J. P. CRAWFORD,
EDWARD E. OSBORN.